US008775748B2

United States Patent
Colbert et al.

(10) Patent No.: US 8,775,748 B2
(45) Date of Patent: *Jul. 8, 2014

(54) METHOD AND SYSTEM FOR TRACKING DATA CORRESPONDENCES

(71) Applicant: VMware, Inc., Palo Alto, CA (US)

(72) Inventors: Osten Kit Colbert, Mountain View, CA (US); Geoffrey Pike, Irvine, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/899,220

(22) Filed: May 21, 2013

(65) Prior Publication Data

US 2013/0263132 A1 Oct. 3, 2013

Related U.S. Application Data

(63) Continuation of application No. 12/183,013, filed on Jul. 30, 2008, now Pat. No. 8,468,310.

(60) Provisional application No. 60/952,882, filed on Jul. 31, 2007.

(51) Int. Cl.
*G06F 12/00* (2006.01)
*G06F 13/00* (2006.01)

(52) U.S. Cl.
USPC .................. 711/154; 711/1; 711/100

(58) Field of Classification Search
CPC ........................................ G06F 12/00
USPC ............................. 711/1, 100, 154
See application file for complete search history.

(56) References Cited

U.S. PATENT DOCUMENTS

| | | | | |
|---|---|---|---|---|
| 5,247,687 A | * | 9/1993 | Eilert et al. | 718/104 |
| 5,721,855 A | * | 2/1998 | Hinton et al. | 712/218 |
| 6,941,310 B2 | * | 9/2005 | Ahad et al. | 1/1 |
| 7,206,872 B2 | * | 4/2007 | Chen | 710/52 |
| 8,127,360 B1 | | 2/2012 | Wilhelm et al. | |
| 2004/0177228 A1 | * | 9/2004 | Leonhardt et al. | 711/170 |
| 2005/0193245 A1 | * | 9/2005 | Hayden et al. | 714/13 |
| 2007/0162641 A1 | | 7/2007 | Oztaskin et al. | |

OTHER PUBLICATIONS

Sapuntzakis, Constantine P. et al.; "Optimizing the Migration of Virtual Computers"; USENIX, Proceedings of the 5th Symposium on Operating Systems Design and Implementaiton, Boston, MA, Dec. 2002.

Nelson, Michael et al.; "Fast Transparent Migration for Virtual Machines"; 2005 USENIX Annual Technical Conference, Palo Alto, CA; p. 391-394; 2005.

(Continued)

*Primary Examiner* — Tuan Thai

(57) ABSTRACT

One embodiment is a method for tracking data correspondences in a computer system including a host hardware platform, virtualization software running on the host hardware platform, and a virtual machine running on the virtualization software, the method including: (a) monitoring one or more data movement operations of the computer system; and (b) storing information regarding the one or more data movement operations in a data correspondence structure, which information provides a correspondence between data before one of the one or more data movement operations and data after the one of the one or more data movement operations. The "monitoring" may comprise monitoring data movement at one or more of an interface between the host hardware platform and the virtualization software, and an interface between the virtual machine and the virtualization software.

12 Claims, 10 Drawing Sheets

(56) References Cited

OTHER PUBLICATIONS

Milojicic, Degan S. et al.; "Process Migration"; ACM Computing Surveys, vol. 32, No. 3; p. 241-299; Sep. 2000.

Wood, Timothy et al.; "Black-box and gray box Strategies for Virtual machine Migration"; Apr. 2007.

Wood, Timothy et al.; "Black-box and gray box Strategies for Virtual machine Migration"; abstract; Apr. 2007.

\* cited by examiner

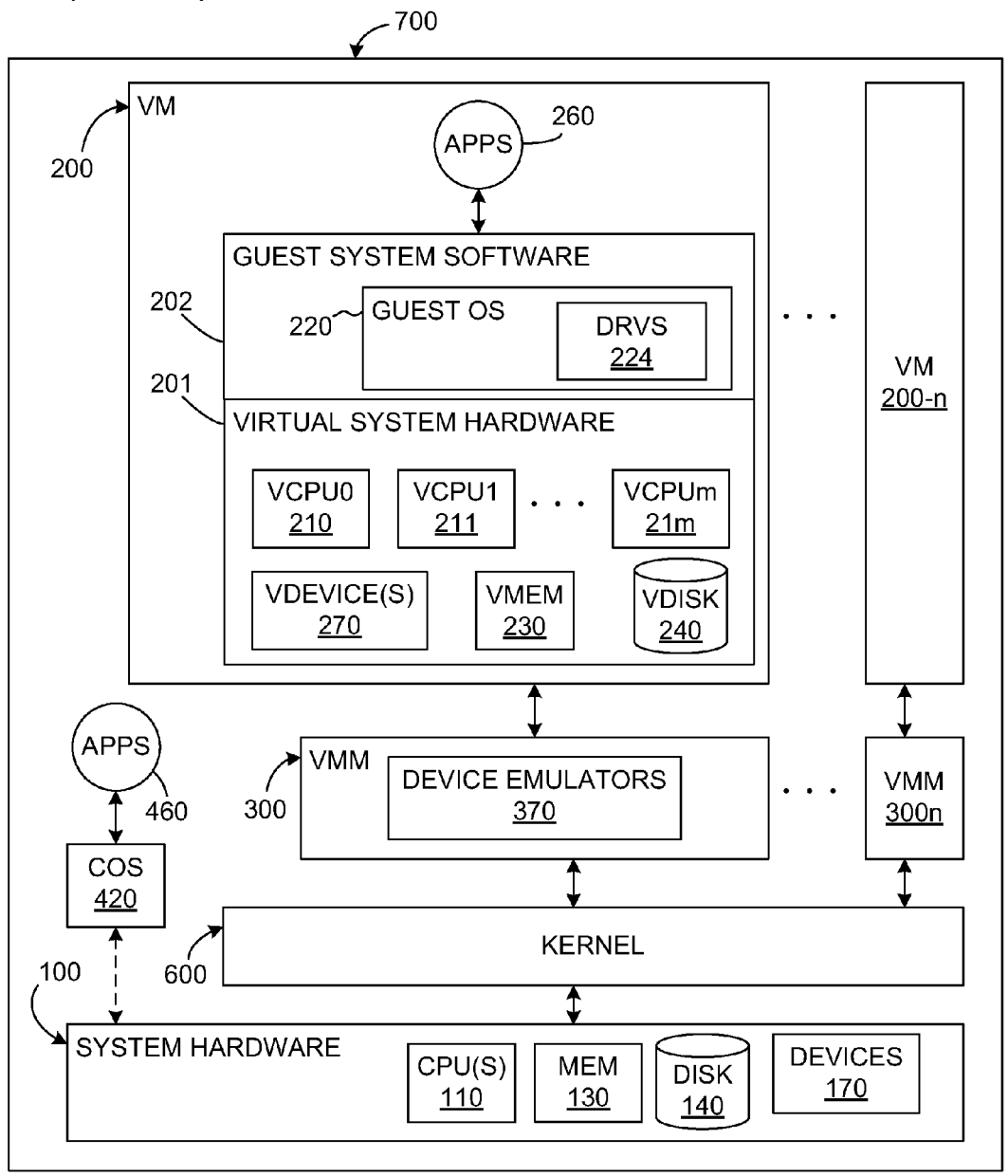

| Virtual Mem ADDR | Physical Mem ADDR | HW ADDR | Time Stamp | Last Access | Con-fidence | Valid/ Invalid | Cost |
|---|---|---|---|---|---|---|---|
| | | | | | | | |
| | | | | | | | |
| | | | | | | | |
| | | | | | | | |
| | | | | | | | |

FIG.5

| Virtual Mem ADDR | Offset | Disk File | Time Stamp | Last Access | Con-fidence | Valid/ Invalid | Cost |
|---|---|---|---|---|---|---|---|
| | | | | | | | |
| | | | | | | | |
| | | | | | | | |
| | | | | | | | |
| | | | | | | | |

FIG.6

METHOD AND SYSTEM FOR TRACKING DATA CORRESPONDENCES

This application claims the benefit of U.S. patent application Ser. No. 12/183,013, filed Jul. 30, 2008, which claimed the benefit of U.S. Provisional Application No. 60/952,882, filed Jul. 31, 2007.

FIELD OF THE INVENTION

One or more embodiments of the present invention relate to tracking correspondences among data, for example, in a virtual computing environment.

BACKGROUND OF THE INVENTION

There are many reasons for migrating a running virtual machine (VM) from one system to another in a network or cluster of processing nodes. These reasons may include: (a) balancing computing load across nodes—if one node is out of resources while other nodes have free resources, then VMs can be moved among nodes to balance the computing load; (b) individual nodes of a cluster can be shut down for maintenance without shutting down VMs running on the node—the VMs can be migrated to other nodes in the cluster; and (c) new nodes can be immediately utilized as they are added to the cluster—currently running VMs can be migrated from nodes that are over-utilized to newly added nodes that have free resources. In addition, it may be necessary to add or remove resources from a server—this need not be related to requirements of the hardware itself, but rather it may be needed to meet the requirements of a particular user/customer. A particular user, for example, may request (and perhaps pay for) more memory, more CPU time, etc., all of which may necessitate migration of a VM to a different server.

During migration of a VM, the time the migrated VM is unavailable should be minimized. If the VM is unavailable for more than a relatively short time, service level agreements with clients that depend on services exported by the VM may be unmet. In addition, the migration should be transparent to clients of the VM. In further addition, the time the VM is dependent on a state stored on a source machine should also be minimized because, as long as the VM is dependent on the source machine, the VM is less fault-tolerant than before it was migrated.

The ESX Server product from VMware, Inc. of Palo Alto, Calif., provides a mechanism for checkpointing an entire state of a VM. When a VM is suspended, all of its state (including its memory) is written to a file on disk. A VM can then be migrated by suspending the VM on one server, and resuming it via shared storage on another server. Writing out the saved state, especially the memory, to disk and then reading it back in again on the new server can take a relatively large amount of time, especially for VMs with large memories. A 512 Mbyte VM, for example, takes about 20-30 seconds to suspend and then resume again. This may be an issue as a delay as short as ten seconds may be noticeable to a user or in violation of a service level agreement.

Nelson et al., in "Fast Transparent Migration for Virtual Machines," published April 2005, proposed a system for transferring a VM from one physical machine to another physical machine by "pre-copying" virtual machine memory. Further, Sapuntzakis et al., in "Optimizing the Migration of Virtual Computers," published December, 2002, proposed a mechanism, referred to as a "capsule," for moving the state of a running computer across a network, including the state of its disks, memory, CPU registers, and I/O devices. As the capsule state is a hardware state, according to Sapuntzakis et al., it includes the entire operating system as well as applications and running processes. Each of these proposals for migrating a virtual machine intends to do so quickly and efficiently while minimizing any perceived disruption to a user.

Some VM migration techniques consume large amounts of disk bandwidth, especially if the suspend-and-resume operations must be done quickly. This can be problematic if the reason a VM is being migrated is because the machine (server) that it is running on is low on available disk bandwidth. Powering down, checkpointing, and restoring are time-intensive operations, in the context of a running system, due to the large amounts of data that must be stored, transferred, and reinitiated.

SUMMARY OF THE INVENTION

One or more embodiments of the present invention are methods for tracking correspondences among data in a virtual computing environment. In particular, one embodiment is a method for tracking data correspondences in a computer system comprising a host hardware platform, virtualization software running on the host hardware platform, and a virtual machine running on the virtualization software, the method comprising: (a) monitoring one or more data movement operations of the computer system; and (b) storing information regarding the one or more data movement operations in a data correspondence structure, which information provides a correspondence between data before one of the one or more data movement operations and data after the one of the one or more data movement operations. The "monitoring" may comprise monitoring data movement at one or more of an interface between the host hardware platform and the virtualization software, and an interface between the virtual machine and the virtualization software

BRIEF DESCRIPTION OF THE DRAWINGS

FIG. 1A is a block diagram of a computer system that implements non-hosted virtualization;

FIG. 5 illustrates a data structure that is maintained and used in accordance with one or more embodiments of the present invention;

FIG. 6 illustrates another data structure that is maintained and used in accordance with one or more embodiments of the present invention;

DETAILED DESCRIPTION

It should be appreciated that one or more embodiments of the present invention can be used with both hosted and non-hosted virtual machines (VMs), with partially virtualized systems (regardless of the degree of virtualization), and with VMs with any number of physical and/or logical virtualized processors. The Appendix discusses virtualization technology. Moreover, one or more embodiments of the present invention may be implemented wholly or partially in hardware, for example and without limitation, in processor architectures intended to provide hardware support for VMs.

An operating system and other programs running inside a VM contain sequences of bytes in a host's physical memory that correspond to other memory, virtual disks, physical disks, other virtual or physical devices, or a combination of sources. Thus, these sequences of bytes are, effectively, recoverable or reconstructable, from these sources. In accordance with one or more embodiments of the present invention, existing interfaces among user level, virtual machine level, operating system level, kernel level, and hardware level functions are leveraged to provide correspondences that can be used to "reconstruct" data. As one non-limiting example, virtualization software (for example, a VMM/hypervisor) is in a functional position to monitor data movement among memory locations and disks, the network, I/O devices, etc. As will be described below in more detail, this functional position can be leveraged to track data correspondences.

One or more embodiments of the present invention provide, among other things, one or more of the following functionalities: (a) tracking recoverable sequences of data using a variety of techniques, and tracking them across: (i) a host-guest boundary, and (ii) any number of virtual or physical memories and devices; (b) tracking data of any size and alignment (previous techniques considered only page-sized and page-aligned data); (c) providing probabilistic determinations as to an effectiveness of data correspondences; and (d) tracking sequences where one set of data is derived from another, for example and without limitation, by a function call (for example, where one set is prepared by compressing another set of data).

In accordance with one or more embodiments of the present invention, one or more data structures are provided that track sequences of bytes that could be used, in one implementation, to aid in recovery and/or migration of virtual machines. Further, in accordance with one or more further embodiments, the data structures contain "value estimates" that rate a "cost" of recovery or migration against a chance of success. Still further, in accordance with one or more still further embodiments of the present invention, one or more policies are applied to the data in the data structure to ensure that the costs and/or chances of success (if the data were used to migrate or reconstruct, for example) are maximized.

Figure 1B:
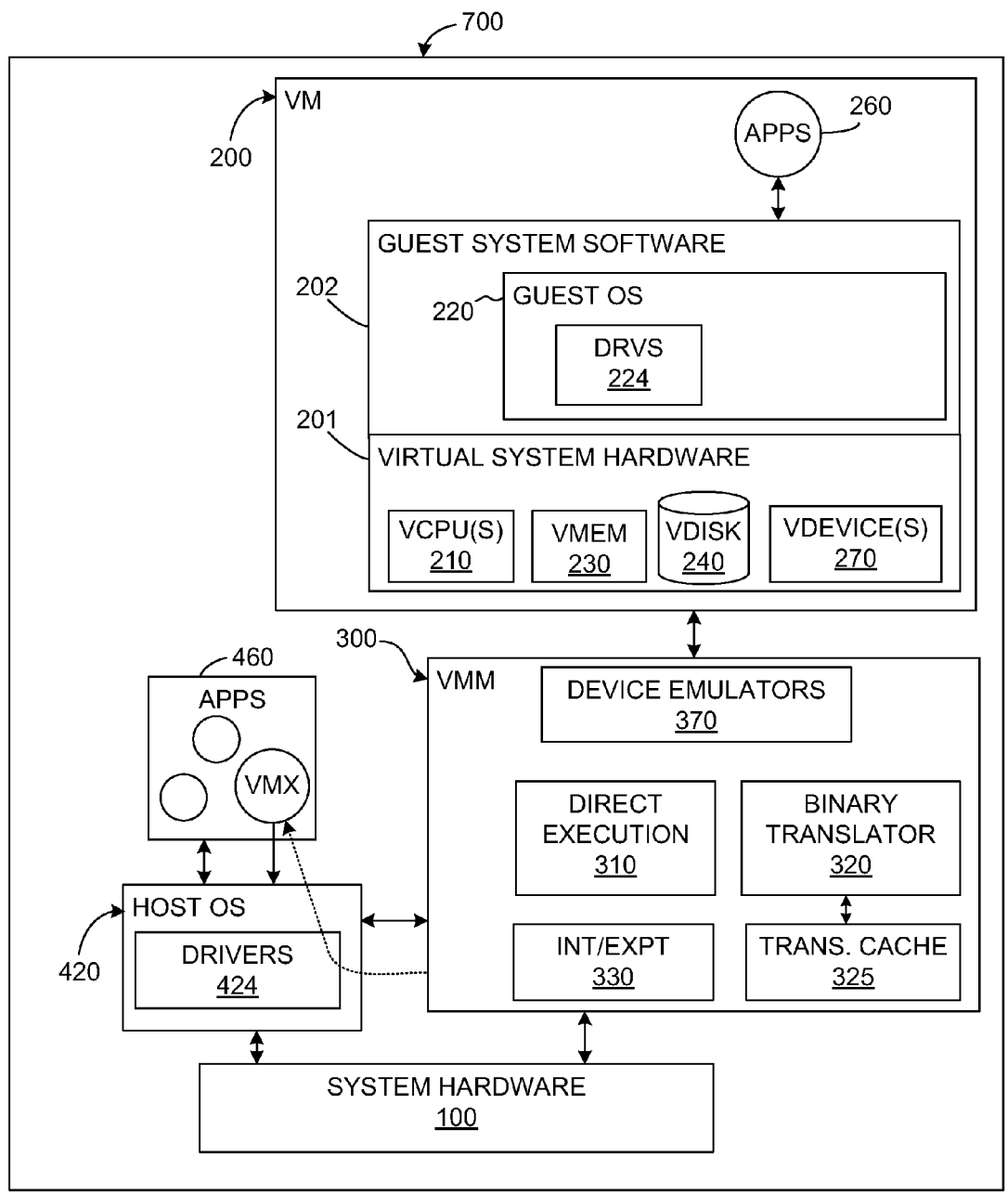
FIG. 1B is a block diagram of a computer system that implements hosted virtualization.
Figure 2:
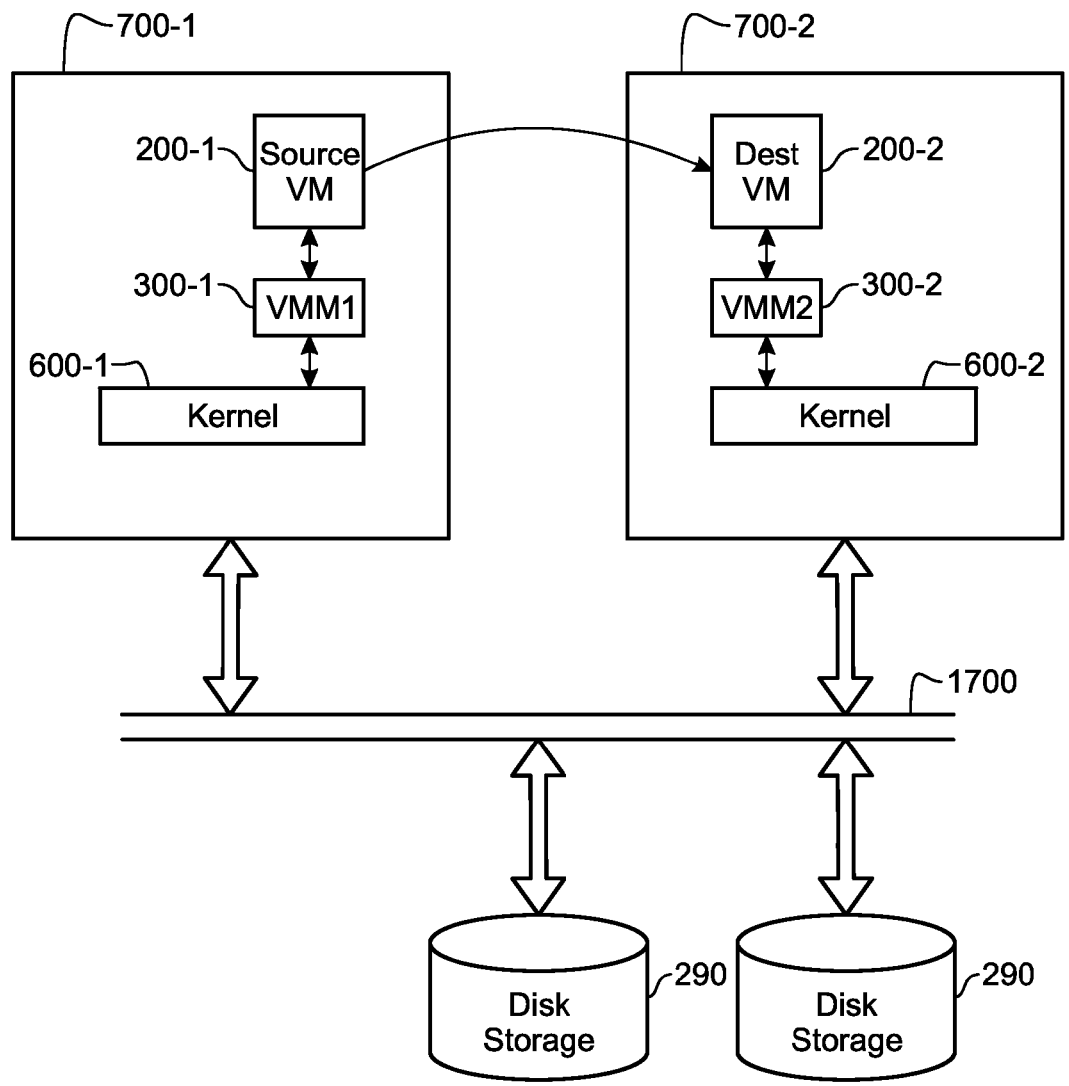
FIG. 2 shows a block diagram of a system of interconnected servers where each server hosts at least one virtual machine (VM)

FIG. 2 shows a block diagram of a system of interconnected servers where each server hosts at least one virtual machine. As shown in FIG. 2, servers 700-1 and 700-2 are connected via network 1700 to create a server "farm." Each of servers 700-1 and 700-2 is configured much like server 700 shown in FIG. 1A and described in the Appendix, and each server will include at least one virtual machine (for example, VMs 200-1 and 200-2, respectively), at least one virtual machine monitor (for example, VMMs 300-1 and 300-2, respectively), and at least one kernel (for example, kernels 600-1 and 600-2, respectively). In addition, and as indicated in FIG. 2, disk storage devices 290 are accessible to each of servers 700-1 and 700-2 over network 1700—network 1700 may be, for example, a Fibre Channel implementation. System hardware is not shown for simplicity and clarity of the figure. Embodiments of the present invention, however, are not limited only to non-hosted systems. As such, this representation is chosen for clarity and ease of explanation.

Figure 3:
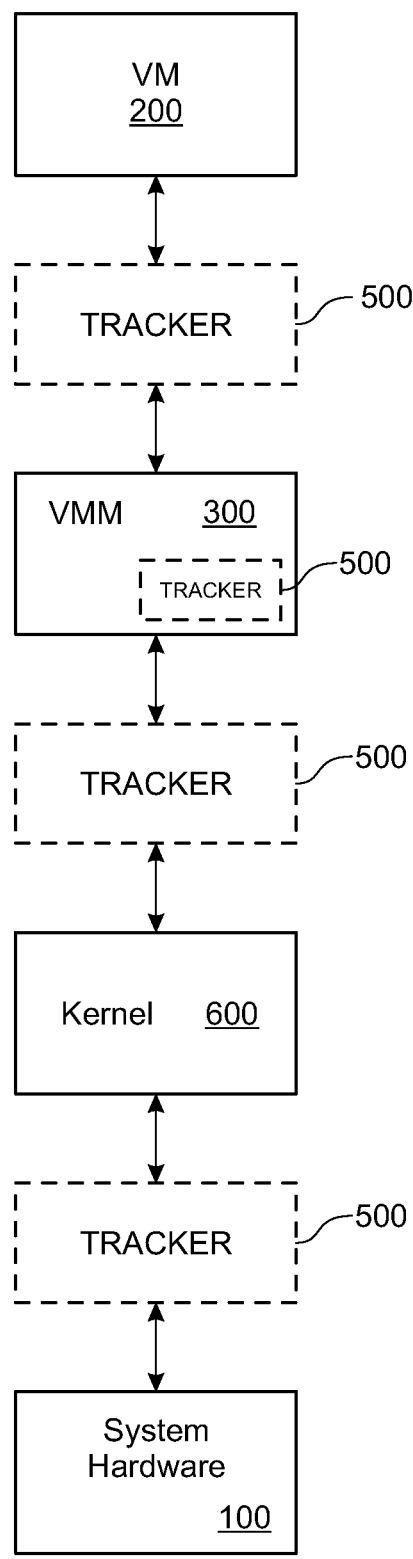
FIG. 3 illustrates various locations within a virtualized system at which an implementation of an embodiment of the present invention can be functionally positioned.

A tracker that is fabricated in accordance with one or more embodiments of the present invention exists in virtualization software or a virtualization layer (refer to the Appendix below). Further, as mentioned above, existing interfaces among user level, virtual machine level, operating system level, kernel level, and hardware level functions may be used to establish correspondences between data. As such, any one or more of these interfaces can be used to fabricate one or more embodiments of the present invention. FIG. 3 shows that tracker 500 can function to monitor one or more of these existing interfaces. For example, as shown in FIG. 3, tracker 500 may function to monitor an interface between VM 200 and VMM 300; or an interface between VMM 300 and kernel 600; or an interface between kernel 600 and system hardware 100. In addition, and in accordance with one or more further embodiments, tracker 500 may be part of VMM 300.

In accordance with one or more embodiments, tracker 500 traps all guest disk reads and creates correspondences between relevant region(s) of guest memory and the guest disk. Existing mechanisms of the VMM are used to determine the location of any guest memory in host swap, host memory, or elsewhere. Further, as these correspondences could become invalid under various circumstances, they would be identified as such. The invalidity of relationships may be detected using standard techniques, e.g., timestamping, callbacks when relevant regions of storage are modified, and the like. In accordance with one embodiment of the present invention, not all of the invalidating circumstances will be tracked, although relevant value estimates may be degraded over time and indicated as such, as explained further below.

Other embodiments of the present invention can use guest operating system-virtual machine monitor interfaces that are used inside the guest by libraries or para-virtualized system software. In that case, arbitrarily complex correspondences can be created which are more specific than those that a hardware interface might allow. For instance, a correspondence between compressed and decompressed data, between encrypted and decrypted data, or even correspondences created by guest-specific system calls, can be tracked.

Figure 4:
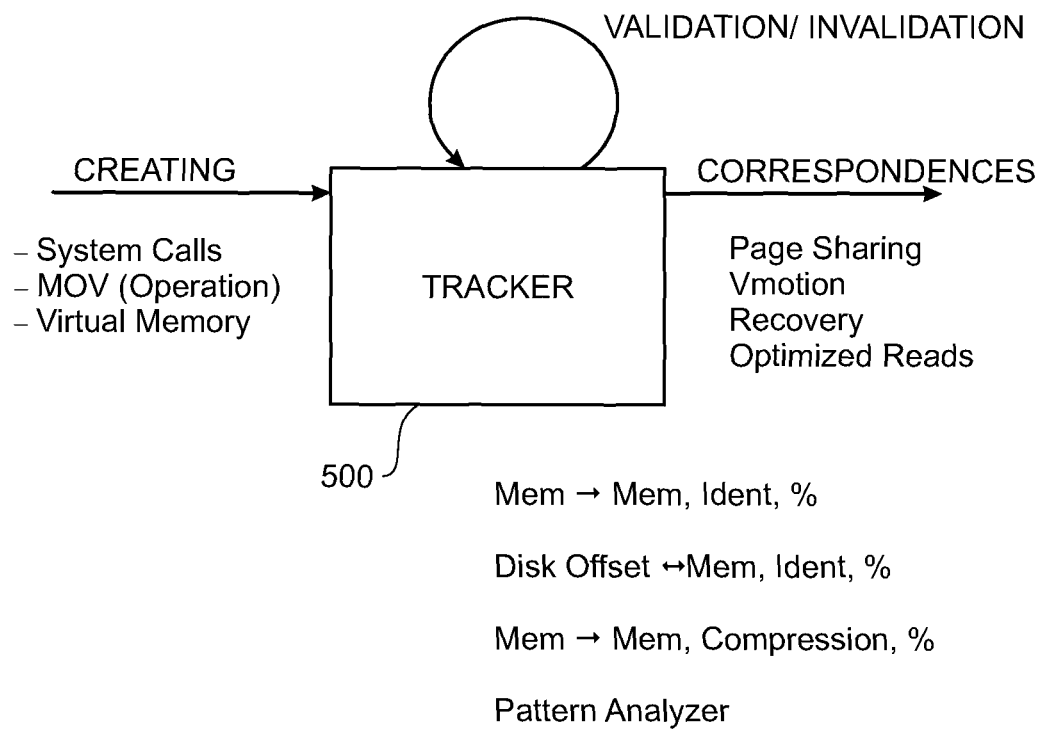
FIG. 4 illustrates information received regarding various type of actions in accordance with one or more embodiments of the present invention, and the types of correspondences that are created in response thereto.

As shown in FIG. 4, in accordance with one or more embodiments of the present invention, tracker 500 creates data correspondences by receiving information regarding, among other actions, system calls, MOV operations, and accesses to virtual memory. As further shown in FIG. 4, in accordance with one or more further embodiments of the present invention, tracker 500 identifies memory location correspondences, related offsets, percentages of completeness; disk offset locations and correspondences to memory locations; and pattern analysis. As still further shown in FIG. 4, in accordance with one or more still further embodiments of the present invention, tracker 500 determines validity/invalidity of the correspondences, as will be discussed below. One of ordinary skill in the art will understand that there are other correspondences that can be tracked at these interfaces. This list is meant to be neither exhaustive nor limiting.

In accordance with one or more embodiments of the present invention, there are two steps involved in dealing with correspondences: first, determining that a correspondence exists, and then, tracking validity or value estimates of each correspondence.

In a virtualized computer system, guest operations are typically implemented, or they can be implemented, in a manner that implies an ironclad correspondence. For example, a guest disk write provides both a piece of memory being copied from, as well as a guest disk sector being written. Upon successful completion of the write, it is effectively guaranteed that the two pieces of storage (memory and disk) are identical, and, in accordance with one or more embodiments of the present invention, that correspondence is tracked—the guest does not necessarily guarantee that the guest disk sector is identical to the guest memory upon completion of the write operation, however, if there are no passthrough devices, the transaction can be tracked by one or embodiments of the present invention.

In accordance with one or more further embodiments of the present invention, correspondences at a processor instruction level are determined and tracked. For example, if a VMM uses binary translation, one or more embodiments of the present invention translate instructions or loops that copy memory, such as "rep mov" to code that implements the memory copy, and then records the correspondence. Here, the VMM monitors an activity without being explicitly notified by the guest. A similar effect is possible without binary translation. For example, in accordance with one or more further embodiments, for example, microcode for "rep mov" could be modified, or the VMM could request that hardware perform a "VT exit" (for processors having such functionality), or otherwise alert tracker 500 at or near each "rep mov."

In accordance with one or more still further embodiments of the present invention, in addition to inferring which operation specific software code is executing, libraries are used for copying memory, encryption, decryption, compression, decompression, and so on. Most implementations of the present invention can benefit from such libraries; however, for those embodiments without a virtual machine, such libraries provide a source of information necessary to construct correspondences. In addition, a para-virtualized guest kernel also allows, for example, use of a guest's system call interface. For example, system calls can arbitrarily permute data; however, with knowledge of the permutation, embodiments of the present invention could track that correspondence.

Embodiments of the present invention can be implemented in virtual machine systems and non-virtual machine systems. For non-virtual machine systems, correspondences based on a soft/ware/hardware interface or new interfaces may be provided, for example and without limitation, by either a kernel or specialized libraries.

To solve the problem of tracking the validity of correspondences, one or more embodiments of the present invention use techniques known for tracking a relationship between sequences of bytes. For example, a known approach of "taint tracking" labels each unit of storage as "tainted" or "untainted," and it updates these labels as data are copied, cleared, or processed. In accordance with one or more embodiments of the present invention, a generalization of that approach is used; however, the meta-data are more expressive. In one non-limiting example, it might be noted that 997 bytes of main memory starting at offset 132 came from a disk read starting at offset 11 of sector 3. As with taint tracking, a suitable set of rules could be enforced upon copying data, and so on. For example, after noting that k bytes at location M in memory are identical to k bytes at location 0 on disk, one embodiment of the invention will, lazily or eagerly, take action if those bytes in memory or on disk are modified. As an example of such a modification, a write to either the memory or disk could completely eliminate an entry in a data structure that contains such correspondences, or it could leave some or all of the data at location M still recoverable. An example of the latter would be if j bytes at M were zeroed, leaving $\max(j, k)$ bytes at M recoverable. Another example: for $i<k$, a modification of i bytes at location D on disk would leave k−i identical bytes at locations D+i and M+i.

In accordance with one or more embodiments of the present invention, it is not necessary to track all ways that a correspondence can become out of date or irrelevant. Assuming that hardware faults are always a possibility, correspondences are only "probably" correct in any case. "Probabilistic" aspects of one or more embodiments of the present invention explicitly model a possibility of stale correspondences and/or other errors. In a simplest "probabilistic" embodiment, a fixed table or formula drives an estimated probability of a correspondence becoming stale, or less relevant or reliable, over time. More complex "probabilistic" embodiments are possible, for example, based on more complex statistics or game theory.

In accordance with one or more further embodiments of the present invention, a method of utilizing approximate information would be to take inferences from "dirty bits" or other coarse-grained indications that chunks of data have been modified. In one example, assume that half-a-page of "interesting" data resided on a page (an interesting region), and the system knows or infers only that some part of that page was later modified. There are several approaches, such as: (a) treating the interesting region as non-recoverable; (b) treating the interesting region as possibly recoverable; or (c) subdividing the interesting region into pieces, with each piece treated as possibly recoverable.

In accordance with one or more embodiments of the present invention, a data structure is provided in which correspondences and other related information are stored and maintained by tracker 500. As shown in FIG. 5, in accordance with one or more such embodiments, the data structure is a table (table 502), where each record 510 represents a correspondence. In accordance with one or more further embodiments, there may be multiple tables 502 where different types of correspondences are tracked, which tables then define a portion, or a totality, of correspondences related to a respective instance of a virtual machine. Alternatively, a single table or data structure may contain correspondence data for a single VM.

As shown in FIG. 5, each record 510 may comprise one or more fields that define a correspondence. For example, in accordance with one or more embodiments of the present invention, table 502 refers to correspondences of virtual memory and physical memory. Thus, in this embodiment, virtual memory address field 512 corresponds to physical memory address field 514 that corresponds to hardware address field 516. Further, in this embodiment, timestamp field 518 records a date and time of creation of record 510. In accordance with one or more such embodiments, timestamp field 518 may be used to "age" the record for evaluation purposes. Still further, in this embodiment, last_access field 520 records the last access by the virtual machine. In accordance with one or more such embodiments, that information, combined with timestamp field 518, may be used to provide a confidence level of the information in record 510, which confidence level may be stored in confidence field 522. In accordance with one or more embodiments of the present invention, the information in table 502 may be updated, and confidence field 522 and valid/invalid field 524 may be changed, based on one or more evaluative algorithms. Finally, in this embodiment, cost field 526 reflects a cost measure or cost value. The cost measure may be expressed in any one of a number of formats, not necessarily limited to currency units, but, rather, in one embodiment, it might be representative of a relative cost of resources for transferring or otherwise using this information as part of, for example, a virtual machine migration as compared to another piece of information. Further, in accordance with one or more embodiments of the present invention, confidence levels or cost measures may be modified as a function of time where either (or both) a confidence level value and a cost value decreases at a predetermined rate over time.

One of ordinary skill in the art will understand that there are other fields of data that can be used to characterize a correspondence. For example, and without limitation, a corresponding memory data length can be included in the data structure. The fields represented here are meant to be neither exhaustive nor limiting.

Similar to that which is illustrated in FIG. 5, FIG. 6 shows alternate data structure 800 which includes one or more records 802 that may comprise one or more fields that define a correspondence. As shown in FIG. 6, table 800 refers to correspondences of virtual memory and locations of data on a disk. Thus, in accordance with one or more embodiments of the present invention, virtual memory address field 804 corresponds to offset value 806, and disk file value 808. Further, timestamp field 810, last_access field 812, confidence field 814, and valid/invalid field 816 have the same type of functionalities as those described above with respect to same-named fields of table 502. Once again, one of ordinary skill in the art will understand that there are other fields of data that can be used to characterize a correspondence. The fields represented here are meant to be neither exhaustive nor limiting.

In accordance with one or more embodiments of the present invention, the output of tracker 500, as reflected in the data structures described above, can be used for page sharing operations involved in a VMotion function, for example and without limitation, as implemented on equipment from VMware, Inc. of Palo Alto, Calif., as well as in recovery functions and optimized read operations.

VMware VMotion allows one to move running VMs from one physical server to another with minimal or no impact to end users. One or more embodiments of the present invention provide for an improvement to the transfer process in the VMotion environment.

Referring back to FIG. 2, assume one wants to start VM 200-2 on server 700-2 based on VM 200-1 currently running on server 700-1. In accordance with one or more embodiments of the present invention, VMotion and similar technologies may carry out the desired operation while transferring less information from server 700-1 to server 700-2 than would previously have been required. For example, in accordance with one or more embodiments of the present invention, a subset of data that VMotion would normally transfer from server 700-1 to server 700-2 could be elided if that subset of data is probably recoverable from other sources. In accordance with one or more such embodiments, recovered data could be used immediately, or it could first be checksummed or otherwise verified against data on server 700-1. Further, in accordance with one or more alternatives of such embodiments, recovered data could be used speculatively, in parallel with checksumming or other mechanism for verification. Further, in accordance with one or more such embodiments, information stored in one or more of the data structures shown in FIGS. 5 and 6 would indicate locations from which the data could be retrieved.

As an illustrative example, and not one intended to limit the scope of embodiments of the present invention, assume that source VM 200-1 has been running on server 700-1 for some time, and that tracker 500 has been tracking and maintaining correspondences for that VM. Specifically, in accordance with one or more embodiments, one type of tracked correspondence would be correspondences between memory locations and offsets into files on disks. As described herein, because reading and writing to files requires virtualization software (for example, VMM) interaction for a typical VM, there will be many regions of memory, possibly large, that are directly mapped to files on disk (such memory may include executable code among other items).

As part of a VMotion transfer, all of the memory information for VM 200-1 is sent across to server 700-2. Normally, this would mean sending those portions of memory that have a correspondence to something on disk. If there is a lot of that type of memory, time would be spent sending that memory information when it is already stored somewhere. Advantageously, in accordance with one or more embodiments of the present invention, correspondences tracked and maintained by tracker 500 are used to identify relevant memory information data, and make VMotion more efficient and, therefore, faster.

In particular, VMotion requires that a source VM's disk must be visible to both the source and destination machine. In accordance with one or more embodiments of the present invention, destination server 700-2 has access to disk 290, and instead of sending the memory information itself directly from source VM 200-1 to destination VM 200-2, destination server 700-2 is informed as to which files on disk correspond with the memory information using a very small message indicating where to find that memory data on the disk. This reduces the overall amount of data that is sent across the network, and also reduces the amount of time the transfer will take. Embodiments of the present invention are not limited, however, to a system with shared storage.

Figure 7:
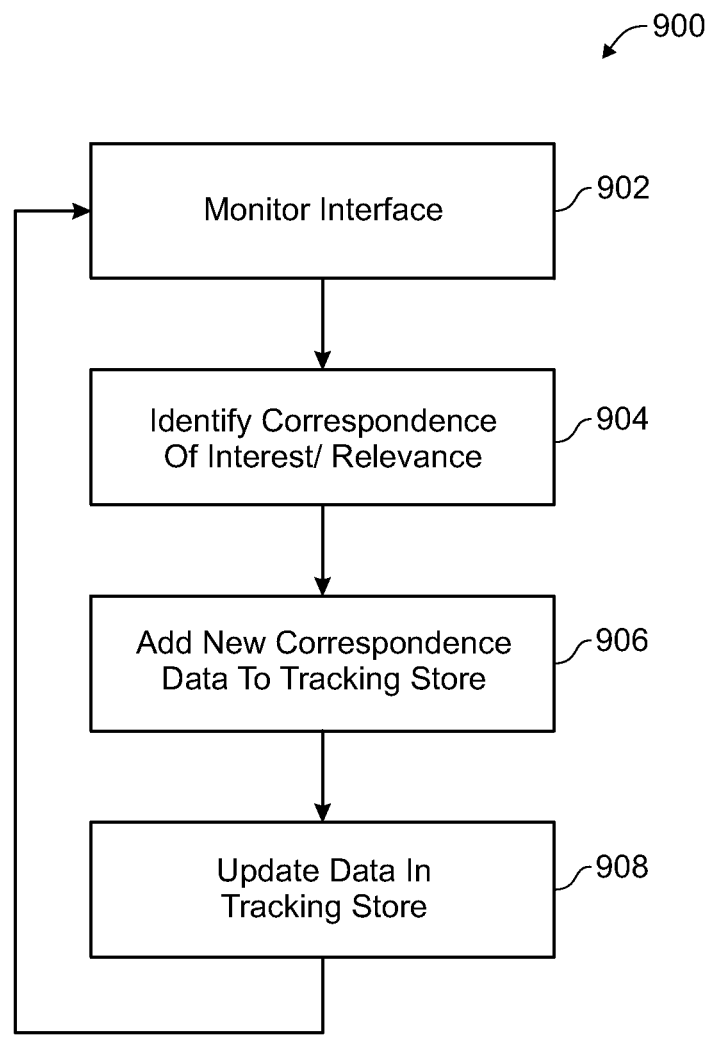
FIG. 7 illustrates a method that operates in accordance with one or more embodiments of the present invention.

FIG. 7 shows a method of operation of tracker 500 in accordance with one or more embodiments of the present invention. As shown at step 902 of FIG. 7, one or more interfaces (described above in conjunction with FIG. 3) are monitored for transactions or operations that qualify for recording or tracking as correspondences. Next, at step 904 of FIG. 7, correspondences that are of interest or relevance are identified. Next, at step 906 of FIG. 7, new correspondence data is added to a tracker data structure (described above in conjunction with FIGS. 5 and 6). Next, at step 908 of FIG. 7, data already in the tracker data structure may be updated, either as a consequence of new information coming across the monitored interface, or for other reasons, as described below.

Figure 8:
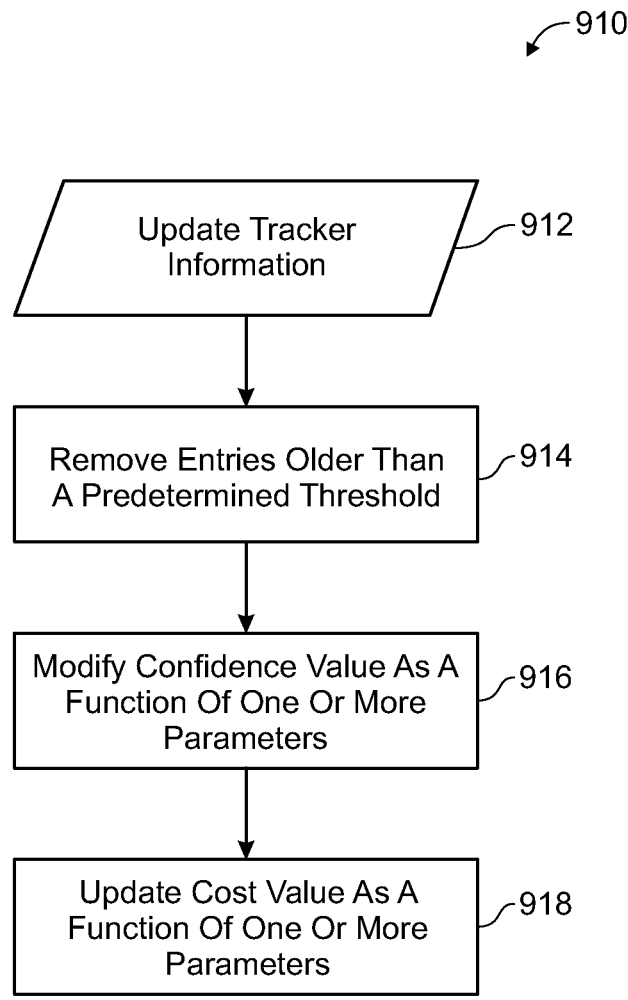
FIG. 8 illustrates a method for updating information in a tracker data structure in accordance with one or more embodiments of the present invention.

FIG. 8 shows a method for updating information in a tracker data structure in accordance with one or more embodiments of the present invention. As shown at step 912 of FIG. 8, operation begins by running either on a regular schedule (for example, on a schedule specific to one or more categories of data) or on an interrupt-driven basis. Next, at step 914 of FIG. 8, entries that are older than a predetermined threshold are removed. In accordance with one or more embodiments of the present invention, the predetermined threshold may vary, for example, depending upon which type of correspondence is being represented. Next, at step 916 of FIG. 8, a confidence value (for example, referring to FIG. 5, confidence value 522, and referring to FIG. 6, confidence value 814) may be modified as a function of one or more predetermined parameters. In one non-limiting example, the confidence value may decrease as a function of the age of the correspondence data. Confidence value may also be a function of age and/or time since last access by the corresponding VM. Any of a number of parameters and/or algorithms may be applied to render a confidence value for an entry. Next, as shown at step 918 of FIG. 8, a cost value may also be modified as a function of other parameters and/or algorithms. In one non-limiting example, the cost value may be a function of an amount of data represented by the correspondence data, its location, etc.

Figure 9:
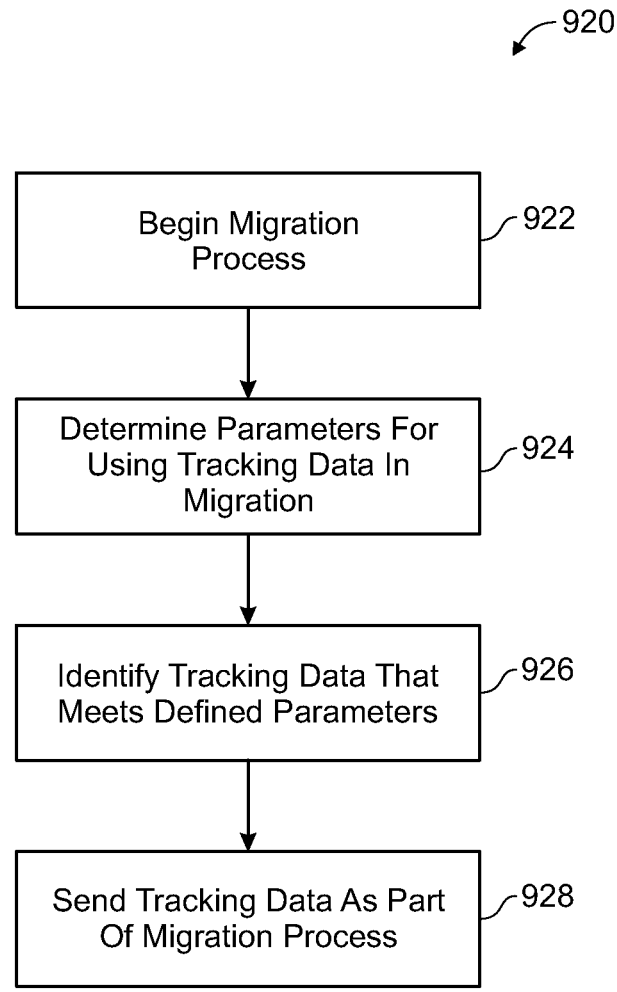
FIG. 9 illustrates a method for migrating a VM in accordance with one or more embodiments of the present invention.

FIG. 9 shows a method for migrating a VM from one location to another in accordance with one or more embodiments of the present invention that is initiated at step 922 of FIG. 9 (the migration may be carried out as part of VMotion referenced above). Next, at step 924 of FIG. 9, as part of migrating a given VM, transfer parameters may be defined. In particular, these transfer parameters are used to determine which correspondences, if any, recorded in the data structure by tracker 500 for the VM to be migrated will be used. In one example, it may be determined that only correspondences that are less than a predetermined age, and/or only of a certain type, and/or only over a predetermined confidence level, and/or having a cost no greater than some predetermined threshold will be used. Next, at step 926 of FIG. 9, once the transfer parameters are defined, then those correspondences that meet the criteria set for those parameters are retrieved. Finally, at step 928 of FIG. 9, correspondence information is used to convey needed state data to the destination VM.

One or more embodiments of the present invention are not limited in their application to that of making VM migration more efficient. In particular, the correspondence information can be used when recovering from errors in a virtualized system. As one example, part or all of a computer's memory can fail. If such a memory failure is detected, then, in accordance with one or more embodiments of the present invention, information that had been in the failed memory can be recovered from, for example, locations on disk. A comparative reliability measure (for example, a confidence level) can be used to determine if the information on the disks is acceptable for use in replacing the failed memory.

Similarly, sometimes a computer must prioritize among data to save before shutting down due to, say, an imminent loss of power. One or more embodiments of the present invention improve such decisions by identifying data that is not to be found, for example, it is already stored, but which should be copied before the system shuts down.

In addition, one or more embodiments of the present invention help reverse transmission errors or inaccuracies due to lossy compression. For example, suppose f(x) is a lossily-compressed version of x, and it is necessary to identify to another system that contains f(x) what x is. Sending x verbatim is not necessarily optimal but, instead, a pointer to the location of x might be.

Further, in checking for errors, for any data in memory that one or more embodiments of the present invention indicates are recoverable, a comparison can be made between in-memory data and a recovered version. One may then infer information about, say, the operation of a memory module.

Embodiments of the present invention have been described herein by way of non-limiting examples in conjunction with the accompanying drawings. The particulars shown are by way of example and for purposes of illustrative discussion of the various embodiments of the present invention only. It is to be understood that embodiments of the present invention are not limited in their application to details of construction and arrangements of components set forth in the description or illustrated in the drawings. Further embodiments of the present invention are capable of being fabricated or of being practiced or carried out in various ways. Also, the phraseology and terminology employed herein are for the purpose of description and should not be regarded as limiting.

It is appreciated that certain features of one or more embodiments of the present invention, which are, for the sake of clarity, described in the context of separate embodiments, may also be provided in combination in a single embodiment. Conversely, various features of one or more embodiments of the present invention, which are, for brevity, described in the context of a single embodiment, may also be provided separately or in any suitable sub-combination.

Embodiments of the present invention may be implemented in a variety of virtual computer systems, based on a variety of different physical computer systems. An embodiment of the invention is described in connection with a specific virtual computer system simply as an example of implementing the invention. The scope of the invention should not be limited to, or by, the exemplary implementation. Further, an embodiment of this invention may be implemented in hardware, that is, a non-virtualized system, for example, a CPU.

Embodiments of the above-described invention may be implemented in all software, all hardware, or a combination of hardware and software, including program code stored in a firmware format to support dedicated hardware. A software implementation of the above described embodiment(s) may comprise a series of computer instructions either fixed on a tangible medium, such as a computer readable media, e.g. diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results.

Lastly, unless specifically stated otherwise as apparent from the discussion above, terms such as "creating," "directing," "redirecting," "producing," "consolidating," "designating," "quiescing," "changing," "migrating," "duplicating," "copying," "checking," "linking," "incorporating," "snapshotting" or the like, refer to actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Appendix

As is well known in the field of computer science, a virtual machine (VM) is an abstraction—a "virtualization"—of an actual physical computer system. FIG. 1A shows one possible arrangement of computer system 700 that implements virtualization. A virtual machine (VM) or "guest" 200 is installed on a "host platform," or simply "host," which includes system hardware 100, that is, a hardware platform, and one or more layers or co-resident components comprising system-level software, such as an operating system (OS) or similar kernel, or a virtual machine monitor, or a hypervisor (see below), or some combination of these, or a similar software layer responsible for coordinating and mediating access to hardware resources.

As software, code defining the VM will ultimately execute on the actual system hardware 100 which typically includes one or more processors (CPUs) 110, some form of memory 130 (volatile and/or non-volatile), one or more storage devices such as one or more disks 140, and one or more other devices 170 which may be integral or separate and removable. In many existing virtualized systems, hardware processor(s) 110 are the same as in a non-virtualized computer with the same platform, for example, an Intel x-86 platform. Because of the advantages of virtualization, however, some hardware processors have also been developed to include specific hardware support for virtualization.

Each VM 200 (including VM 200 and additional "n" number of VMs 200-n) will typically have both virtual system hardware 201 and guest system software 202. The virtual system hardware typically includes at least one virtual CPU (for example, VCPU0 210-VCPUm-21$m$), virtual memory (VMEM) 230, at least one virtual disk (VDISK) 240 or similar virtualized mass storage device, and one or more virtual devices (VDEVICE(S)) 270. Note that a disk—virtual or physical—is also a "device," but is usually considered separately because of the important role it plays. All of the virtual hardware components of a VM may be implemented in software using known techniques to emulate corresponding physical components. The guest system software includes guest operating system (OS) 220 and drivers 224 as needed for example, for the various virtual devices 270.

To permit computer systems to scale to larger numbers of concurrent threads, systems with multiple CPUs—physical or logical, or a combination—have been developed. One example is a symmetric multi-processor (SMP) system, which is available as an extension of the PC platform and from multiple vendors. Another example is found in a so-called "multi-core" architecture, in which more than one physical CPU is fabricated on a single chip, with its own set of functional units (such as a floating-point unit and an arithmetic/logic unit ALU), and which can execute threads independently from one another. Still another technique that provides for simultaneous execution of multiple threads is referred to as "simultaneous multi-threading," in which more than one logical CPU (hardware thread) operates simultaneously on a single chip, but in which logical CPUs flexibly share not only one or more caches, but also some functional unit(s) and sometimes also a translation lookaside buffer (TLB).

Similarly, a single VM may (but need not) be configured with more than one virtualized physical and/or logical processor. FIG. 1A illustrates multiple virtual processors VCPU0 210, VCPU1 211, . . . , VCPUm 21m) within VM 200. Each virtualized processor in a VM may also be multi-core, or multi-threaded, or both, depending on the virtualization. One or more embodiments of the present invention may be used regardless of the type—physical and/or logical—or number of processors included in a VM.

As is well known, "virtualization software" interfaces between guest software within a VM and various hardware components and devices in the underlying hardware platform. This interface—which may be referred to generally as "virtualization software" or a "virtualization layer"—may include one or more software components and/or layers, possibly including one or more of the software components known in the field of virtual machine technology as a "virtual machine monitor" (VMMs 300, 300n), "hypervisors," or virtualization "kernels." Because virtualization terminology has evolved over time and has not yet become fully standardized, these terms do not always provide clear distinctions between the software layers and components to which they refer. For example, the term "hypervisor" is often used to describe both a VMM and a kernel together, either as separate but cooperating components or with one or more VMMs (300-300n) incorporated wholly or partially into the kernel itself; however, the term "hypervisor" is sometimes, however, used instead to mean some variant of a VMM alone, which interfaces with some other software layer(s) or component(s) to support the virtualization. Moreover, in some systems, virtualization code is included in at least one "superior" VM to facilitate the operations of other VMs. Furthermore, specific software support for VMs is sometimes included in the host OS itself. Unless otherwise indicated, one or more embodiments of the present invention may be used in virtualized computer systems having any type or configuration of virtualization software.

By way of illustration and example only, FIGS. 1A and 1B show each VM running on, or with, a corresponding virtual machine monitor. The description's reference to VMMs is also merely by way of common example. A VMM is usually a software component that virtualizes at least one hardware resource of some physical platform so as to export a hardware interface to the VM corresponding to the hardware the VM "thinks" it is running on. As FIG. 1A illustrates, a virtualized computer system may (and usually will) have more than one VM, each of which may be running on its own VMM.

The various virtualized hardware components in a VM, such as virtual CPU(s) 210, etc., virtual memory 230, virtual disk 240, and virtual device(s) 270, are shown as being part of VM 200 for the sake of conceptual simplicity. In actuality, these "components" are often implemented as software emulations included in some part of the virtualization software, such as the VMM.

FIGS. 1A and 1B show VMMs that appear as separate entities from other components of virtualization software. Furthermore, some software components used to implement one illustrated embodiment of the present invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. Again, unless otherwise indicated or apparent from the description below, it is to be assumed that one or more embodiments of the present invention can be implemented anywhere within the overall structure of the virtualization software, and even in systems that provide specific hardware support for virtualization.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another term, which has yet to achieve a universally accepted definition, is that of "para-virtualization." As the term implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define the term para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, embodiments of the present invention are not restricted to use in systems with any particular "degree" of virtualization and is not to be limited to any particular notion of full or partial ("para-") virtualization.

In addition to the distinction between full and partial (para-) virtualization, two arrangements of intermediate system-level software layer(s) are in general use as, or as part of, the virtualization software—a "hosted" configuration (illustrated in FIG. 1B) and a non-hosted configuration (illustrated in FIG. 1A). In a hosted virtualized computer system, an existing, general-purpose operating system forms a "host" OS that is used to perform certain input/output (I/O) operations, alongside and sometimes at the request and direction of a virtualization software component such as VMM 300. Host OS 420, which usually includes drivers 424 and supports applications 460 of its own, and the VMM (or similar component) are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators 370, FIG. 1B also illustrates some of the other components that are also often included in the VMM of a virtualization system; many of these components are found in the VMM of a non-hosted system as well. For example, exception handlers 330 may be included to help context-switching (see again U.S. Pat. No. 6,496,847), and a direct execution engine 310 and a binary translator 320, often with an associated translation cache 325, may be included to provide execution speed while still preventing the VM from directly executing certain privileged instructions in systems that do not otherwise provide such protection (see U.S. Pat. No. 6,397,242, Devine, et al., "Virtualization System Including a Virtual Machine Monitor for a Computer with a Segmented Architecture," 28 May 2002).

As illustrated in FIG. 1A, in many cases, it may be beneficial to deploy VMMs on top of a software layer—kernel 600—constructed specifically to provide efficient support for the VMs. This configuration is frequently referred to as being "non-hosted." Compared to a system in which VMMs (or other software components or layers with similar functionality) run directly on the hardware platform (such as shown in FIG. 1B), use of a kernel offers greater modularity and facilitates provision of services (for example, resource management) that extend across multiple virtual machines. Further, a kernel may offer greater performance because it can be co-developed with the VMM and be optimized for the characteristics of a workload consisting primarily of VMs/VMMs as compared to a hosted deployment. Kernel 600 also handles any other applications running on it that can be separately scheduled, as well as a temporary "console" operating system 420 that, in some systems, is included for such operations as booting the system as a whole or enabling certain user interactions with the kernel. Note that kernel 600 is not the same as the kernel that will be within the guest OS 220. Note also that kernel 600 is part of the "host" platform of the VM/VMM as defined above even though the configuration shown in FIG. 1A is commonly termed "non-hosted;" moreover, the kernel may be both part of the host and part of the virtualization software or "hypervisor." The difference in terminology is one of perspective and definitions that are still evolving in the art of virtualization. The console OS in FIG. 1A may be of the same type as the host OS in FIG. 1B, which is why they are identically numbered—the main difference is the role they play (or are allowed to play, if any) once the virtualized computer system is loaded and running. One example of a non-hosted, virtualized computer system is described in U.S. Pat. No. 6,961,941 (Nelson, et al., "Computer Configuration for Resource Management in Systems Including a Virtual Machine," 1 Nov. 2005).

At least some virtualization technology provides that: (a) each VM 200, . . . , 200n has its own state and is an entity that can operate independently of other VMs; (b) the user of a VM, that is, a user of an application running on the VM, will usually not be able to notice that the application is running on a VM (which is implemented wholly as software) as opposed to a "real" computer; (c) assuming that different VMs have the same configuration and state, the user will not know, and would have no reason to care, which VM he is currently using as long as performance is acceptable; (d) the entire state (including memory) of any VM is available to its respective VMM, and the entire state of any VM and of any VMM is available to kernel 600; and (c) as a consequence of the foregoing, a VM is "relocatable."

As shown in FIG. 1A, the multi-VM system can be implemented in a single physical machine 700, such as a server. Typically, devices such as keyboards, monitors, etc., will also be included to enable users to access and use the system via a network of any known type; these are not shown for the sake of simplicity.

In systems configured as in FIG. 1A, the resources of a single physical machine are managed. Virtual machines are installed on the hardware platform and the CPU(s), network, memory, and disk resources for that machine are managed by kernel 600 or similar server software. To balance computing resources, some systems implement a "migration" of a running virtual machine (VM) from one system to another.

What is claimed is:

1. In a computer system comprising a host hardware platform, virtualization software running on the host hardware platform, and a virtual machine running on the virtualization software, a method for tracking data correspondences which comprises:
    monitoring one or more data movement operations of the computer system; and
    storing information regarding the data movement operations in a data correspondence structure, the information for each of the data movement operations including data correspondence information between a data location in a virtual memory of the virtual machine and a data location in a physical component that is accessible by the computer system;
    wherein monitoring comprises monitoring data movement at one or more of an interface between the host hardware platform and the virtualization software, and an interface between the virtual machine and the virtualization software.

2. The method of claim 1 wherein the data correspondence information comprises a virtual memory address of the virtual machine that corresponds to one of a physical memory address of the computer system and a data location of a physical disk.

3. The method of claim 1 wherein monitoring comprises monitoring data movement among memory location, a disk, a network, virtual memory, physical memory, and an I/O device.

4. The method of claim 1 wherein the monitoring comprises tracking data of any size and alignment.

5. The method of claim 1 wherein the data movement operation comprises deriving a set of data from another set of data.

6. The method of claim 5 wherein deriving comprises deriving by a function call.

7. The method of claim 5 wherein deriving comprises compressing the another set of data.

8. The method of claim 7 wherein deriving comprises encrypting or decrypting the another set of data.

9. A method of transferring a first virtual machine running on first virtualization software running on a first computer system to a second computer system, the first computer system comprising a first host hardware platform, the method comprising:
    retrieving data correspondences for the first virtual machine, each of the data correspondences including a data location in a virtual memory of the first virtual machine that corresponds to a data location in a physical component that is accessible by the first computer system;
    identifying valid data correspondences from the retrieved data correspondence as a function of a predetermined algorithm;
    identifying locations of data corresponding to the valid state data correspondences; and
    sending the identified data locations to the second computer system.

10. The method of claim 9 wherein the retrieved state data correspondences comprise at least one of: a validity indicator, a cost value, and an age value, the method further comprising:
    identifying the valid state data correspondences as a function of one or more of the validity indicator, the cost value, and the age value.

11. The method of claim 9, wherein each of the data correspondences comprises a virtual memory address of the virtual machine that corresponds to one of a physical memory address of the computer system and a data location of a physical disk.

12. The method of claim 9, further comprising the second computer system:
    receiving the identified data locations;
    retrieving the corresponding data from the identified data locations, the corresponding data being a subset of data needed to initiate the first virtual machine on the second computer system;
    receiving another subset of data needed to initiate the first virtual machine on the second computer system from the first computer system; and
    initiating the first virtual machine on the second computer system using the subset of data retrieved from the identified data locations and the another subset of data received from the first computer system.

* * * * *